April 21, 1942.　　F. S. DENNEEN ET AL　　2,280,689
METHOD OF MAKING COMPOSITE ARTICLES
Filed May 2, 1940
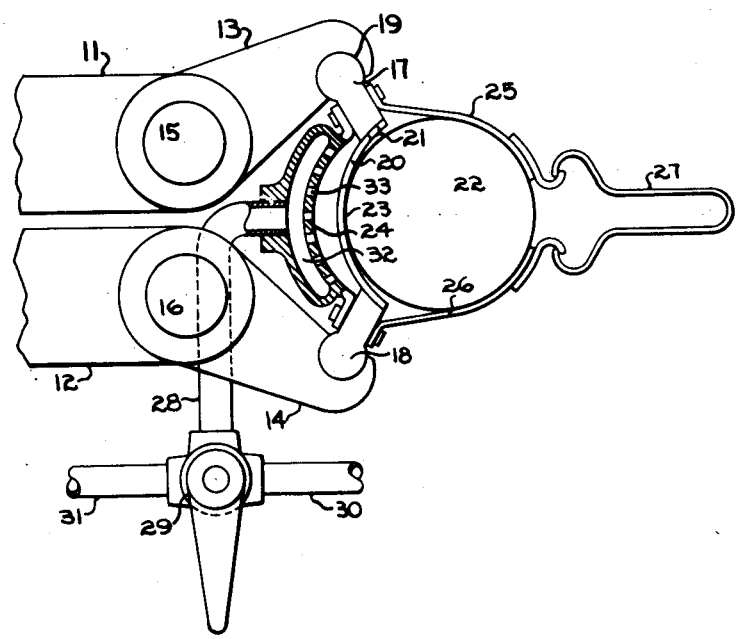
INVENTORS
Francis S. Denneen
William C. Dunn Patented Apr. 21, 1942

2,280,689

UNITED STATES PATENT OFFICE 2,280,689

METHOD OF MAKING COMPOSITE ARTICLES

Francis S. Denneen, Cleveland, and William C. Dunn, Shaker Heights, Ohio, assignors to Ohio Crankshaft Company, Cleveland, Ohio, a corporation of Ohio Application May 2, 1940, Serial No. 332,896

9 Claims. (Cl. 219—10)

The present application as a continuation in part of our co-pending application Serial No. 747,347, filed October 8, 1934, is directed to the method originally shown in Figure 11 of that co-pending application.

Heretofore, when one piece of material was joined to another by fusing together the adjacent surfaces, it was usually necessary to heat large portions of the articles, the heat extending considerable distances into the material adjacent to the surfaces to be joined. This heating required the use and loss of large amounts of energy by the heat migrating into parts unnecessary to heat; it required the provision of heating means of considerable magnitude to engage or surround the parts to be fused together, and required a great deal of time and skill in effecting a satisfactory joint. From these former processes there resulted warping and distortion in the articles thus joined and a loss in certain of the desired physical properties such as hardness, strength, and fatigue resisting qualities of the materials.

This invention has for its chief object the provision of a method for fusing one surface to another without heating parts other than those immediately adjacent to the surfaces to be joined. Another object is to provide a method for joining one surface to another by locally heating only a fusible coating applied to one or both of said surfaces and without detrimentally heating the parts to be joined. A further object is to provide a method for purifying or refining the metal at the joint and at fusing temperature. An additional object is to provide a method of simultaneously fusing a surface layer on an article and heating said layer to hardening temperature. Another object is to provide a method of repairing surfaces of worn bearings such as the bearings of shafts. Another object is to provide a method of fusing a surface layer onto an article which method is inexpensive, reliable in its results, and which can be accomplished without the use of large and cumbersome equipment.

With these and other objects in view which will appear as the description proceeds, said invention then consists of the method of use of the disclosed apparatus or of such modifications of it as will produce the results described or their equivalents. We desire to have it understood that the invention is not limited to the details of construction and the arrangement of parts illustrated in the accompanying drawing as the invention is capable of many other embodiments and the phraseology employed is for the purpose of description and not for limitation.

In the drawing the sole figure illustrates diagrammatically the principal elements of the apparatus required to practice our method of fusing and hardening a wear resisting shell on a metallic article. This apparatus has particular advantages in attaching certain kinds of shells to shafts or similar articles. In this, the heating current is introduced by means of terminals 11 and 12 to the electrode carriers 13 and 14 hinged at 15 and 16. The electrodes 17 and 18, which have a limited oscillatory movement in the carriers by means of their form at 19 contact with the shell 20 at or adjacent to its edges. Suitable projections 21 to engage recesses in the shell may be used to hold the shell in position. It will be evident that heating current in passing between the electrodes will flow thru the shell and thus heat it rapidly. If current of sufficient density and of relatively high frequency is employed, its inductive action on the surface metal of the shaft 22 will cause the heating to be most intense along the contacting surfaces that are to be fused.

To enhance the fusing action, the shell may be bent to a form having a radius of curvature somewhat greater than that of the shaft, causing initial contact at 23 and a wrapping action of the shell onto the shaft as the temperature of the shell causes it to lose strength, permitting pressures applied by the electrode carriers to bend the shell to the form of the shaft. To further aid the fusion, the jacket members 24, 25 and 26, together with suitable enclosing end flanges, not shown, form an enclosure surrounding the shell 20 and such portion of the shaft 22 as may be necessary, to prevent leakage of hydrogen or other gas, thereby constituting a controlled de-oxidizing atmosphere around the heated region. These jacket members are held in assembled position by a suitable means such as the spring clamp 27. Prior to the application of current, hydrogen or other suitable gas is introduced into the space within the jacket members in such quantity as to expel the air originally therein and to leave a reducing atmosphere surrounding the region of the fusion during the heating interval. After fusing onto the shaft one shell member such as 20, the shaft may be rotated or otherwise moved and another shell element inserted in the jacket and attached adjacent to the first shell element.

By connecting a pipe or tube 28 from a valve such as 29 the controlled atmosphere can be supplied from line 30 when the valve is in the required position during heating. The supply of this atmosphere can be interrupted and quenching fluid supplied from line 31 when the valve is turned to quenching position. This suddenly fills the jacket space 32 and cools the shell or strip fused to the shaft or article 22 by projecting the quenching fluid onto it thru orifices 33. It will be understood that the quenching fluid in entering the space adjacent to the shell will displace such atmosphere as may have previously been provided in this space.

With a suitable flux present or when surrounded by a suitable reducing atmosphere, the shells may, with our process, be directly fused or welded to the shaft without the use of an intervening metallic substance. However, by coating one or both of the contacting surfaces to be joined with a suitable metallic coating, such, for instance, as finely divided copper or copper bearing metal, or by inserting between the shells and shaft strips of foil or of thin sheets made from copper, bronze or some other suitable material, the shells and shaft may be brought into strong fused contact at a much lower temperature than would be necessary otherwise. Fusing at such lower temperature has the advantages of making the process easier and cheaper to accomplish and of producing satisfactory results with far less injury to the surfaces heated and with far less impairment of the physical properties possessed by the shells and shaft prior to the fusing process. Further, the fusing temperature would be so close to the correct temperature for quenching and hardening the shells, or for annealing the shells in case their composition is such that annealing results from heating and quenching, that little or no cooling or reheating would be necessary between the fusing and the quenching operations.

This invention is of particular value in cases where it is desired to provide a hardened zone on an article made from material that is not susceptible to hardening except at the penalty of increased machining difficulties and with the possible introduction of structural defects. For instance, in the case of a crankshaft of odd or intricate shape, it may be desirable to make the crankshaft from cast material which would not provide the desired hardness in the bearing areas. Our invention permits attaching and hardening bearing shells at places where needed. This particular feature of our invention is susceptible of wide and varied application.

Under certain conditions it may be satisfactory to make the shell to be hardened from a steel of a kind that, after having been heated, will harden readily upon being exposed to the air or upon being subjected to a blast or jet of air or other gas.

The cooling effect of the unheated core or of portions of the article adjacent to the heated shell serves to accelerate and aid in the cooling and hence in the hardening of the shell that has been heated for hardening, and, further, under certain conditions the hardening thus resulting may be sufficient without the necessity of cooling by air, quenching or other exterior cooling means.

Since with our process the heating is accomplished so quickly, and further, since the heat is localized in a comparatively shallow zone, the hardening under such conditions may be further accelerated and improved by refrigerating the article prior to the application of the heated shell.

To completely purge the enclosure by removing atmospheric air, and for the purpose of permitting sufficient quantities of the hydrogen or other controlled atmosphere to contact with the surfaces to be fused, the shell or plate to be attached may be held in a slightly spaced relationship with the article to which it is to be applied during a part of the heating interval.

By using shells of shallow depth and by regulating the rate of delivery of energy to the shells, the penetration of heat into the article under the shell may be confined to a very shallow zone and thus properties originally provided in the article will be disturbed only in the immediate vicinity of the surface of the article and its strength and other physical characteristics will thus remain substantially unimpaired.

When shells are applied to a surface of an article for the purpose of providing a hard outer zone, a definite relationship between the hardness of such shell and of the article under the shell may be established. For example, in certain classes of work a steel will be required which may necessarily be soft and of low elastic limit in order to have the required fatigue characteristics for alternating stresses, but which at the same time requires a hard surface to resist wear. By applying a shell of hardening steel to such an article, a surface zone having a Shore hardness of 85 or more may be provided while interior portions of the article may have a Shore hardness of less than half of that of the surface.

Surface shells may be applied to an article for numerous reasons other than those of providing hardness or adding strength such for example as for resisting corrosion. This would find use in the manufacture of tubing and pipes in which a surface of so-called stainless steel having a high chromium and nickel content or other analysis is required as in dairies and in chemical plants where such surface is required for the interior of the pipes or tubes and in piping which is placed in the earth such as for the transportation of gas, oil and water, and in which cases the contents of the soil corrode the exterior surfaces.

The application of a relatively thin strip of metal to another strip may be accomplished by our method. In this the surface of one strip is brought into substantial contact with the surface of another and maintained in contacting relationship while the strips are moved together adjacent to an inductive heater which brings their contacting surfaces to fusing temperature. To provide uniformity in the fused joint it may be desirable to provide one of the contacting surfaces with a flux or other substance which removes oxides and any other impurities which would interfere with the fusing of the surfaces. The removal of oxides is readily accomplished by surrounding the fusing area with an atmosphere of hydrogen or other reducing agent which is permitted to penetrate into the space between the surfaces to be joined. This may be accomplished by passing the strips of metal thru a container filled with such an atmosphere and which may also contain a part of the heater or in some instances the container and the heater may be caused to pass over the strip or other stock to be fused when limitations as to size or weight may so require.

In the preceding description and in the following claims the term "shell" has been employed in a general sense to define the relatively thin portion applied to a surface of an article, and is intended to include any and all parts of this general class, even of considerable thickness, whether flat or curved or irregular in form.

It will be apparent that actual contact of the shell with the shaft is not necessary during the heating interval as the currents in the surface zones of the shaft will increase its temperature sufficiently to produce fusion, heat from this surface supplementing ohmic resistance heat in the shell by radiation. The space between the shell and the surface of the article as well as the frequency and rate of power input determine the relative rise in temperature of the shell and of the surface zone being heated to fusing temperature. It will be evident that any space provided between the shell and the surface zone of the shaft can be readily changed during heating by changing the distance between the shaft and the electrode holders, it being understood that the enclosure for the controlled atmosphere is flexible enough to permit such change which is accomplished by carrying the shaft on an eccentric or by shifting its supports by means of screws or other means.

When the temperature of the shell is below hardening temperature at the time the shell is brought into engagement with the surface of the article which is at fusing temperature, heat from the region at fusing temperature will pass into outer parts of the shell to increase its temperature sufficiently to harden by quenching. In fusing steel to steel, the fusing temperature is of the order of 3000° F. while the hardening temperature is of the order of 1500° F. Thus, if the shell is relatively thin, reflected heat from the adjacent surface of the article approaching fusing temperature will increase the heat of the shell, and when the shell is brought into intimate contact to effect fusion, heat in the fusing joint region will flow into the shell by conduction to further heat this shell. It is thus relatively easy to bring the shell to hardening temperature substantially at the time the surfaces at the joint reach fusing temperature.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a method of manufacturing a composite article, the steps comprising placing a surface of an element in proximity with a surface zone of the article, said element being adapted to serve as a conductor, connecting a terminal of a source of current to said element, passing high frequency current from said source thru said element to heat said element and to induce heating current in the surface zone of the article to heat the surface zone to fusing temperature, and applying pressure to said element to deflect said element when the element loses strength due to its rise in temperature to bring the surface of the element into intimate contact with the surface zone of the article to effect a welding together of the element and the article.

2. In a method of manufacturing a composite article, the steps comprising placing a surface zone of an element in proximity with a surface zone of the article, the said element being adapted to be hardened by heating and quenching, connecting terminals of a source of high frequency current to said element as a conductor to induce sufficient heating current in the proximate surface zone of the article to heat the proximate surface zone of the element to fusing temperature by heat being transferred from the surface zone of the article to said surface zone of the element and to heat a remaining portion of the element to hardening temperature, and bringing the proximate surface zones of said element and said article into intimate contact to effect a fusing together of the zones.

3. In a method of manufacturing a composite metallic article, the steps comprising placing a surface zone of an element in proximity with a surface zone of the article, the said element being adapted to be hardened by heating and quenching, connecting terminals of a source of high frequency current to said element, passing high frequency current thru the terminals and the element to heat said element by the ohmic resistance of the element, the current in said element inducing heating current in the proximate surface zone of the article to heat said surface zone to fusing temperature, a part of the heat being produced in the surface zone of the article being transferred to the proximate surface zone of the element to supplement the heat due to ohmic resistance to raise the temperature of the surface zone of the element to fusing temperature and to heat a remaining portion of the element to hardening temperature, and applying pressure to the element to bring the surface zone of the element into welding contact with the surface zone of the article.

4. In a method of providing a metallic article with a hard surface zone, the steps comprising providing a strip of metal adapted to be hardened by heating and quenching, bringing said strip into substantially parallel proximity with a surface of the metallic article, passing high frequency current thru a central part of the strip as a conductor in a high frequency power circuit to induce heating current in the surface zone of the article to heat the surface zone of the article to fusing temperature, the current in the strip being substantially parallel with the surface of the article, regulating the distance between the strip and the article and regulating power delivered to the said central part of the strip to raise the strip to hardening temperature when the surface of the article reaches fusing temperature, and then pressing the strip onto the heated surface of the article to effect fusion therewith, and projecting fluid onto said strip solidify the metal in the heated zone.

5. In a method of manufacturing a composite article, the steps comprising providing a strip of metal adapted to be hardened by heating and quenching, bringing a part of a surface of said strip substantially into contact with a surface of a part of the article, passing high frequency current longitudinally thru the strip as a conductor in a high frequency power circuit to induce heating current in a surface zone of the said part, bending said strip into intimate contact with the surface of the said part as the temperature of said strip rises, and then reducing the temperature of the strip.

6. In a method of manufacturing a composite article, the steps comprising providing a strip of metal adapted to be hardened by heating and quenching, bringing a surface of said strip into substantial contact with a part of a surface of the article, passing high frequency current thru the strip as a conductor in a direction substantially parallel with the surface of the article to heat said strip and to induce heating current in a surface zone of the article, substantially surrounding said strip with a controlled atmosphere, bending said strip into intimate contact with the surface of the article to effect fusion as the temperature of the strip rises, and then displacing the controlled atmosphere with cooling fluid.

7. In a method of providing a metallic article with a wear resisting surface, the steps comprising placing an inner surface zone of a first shell substantially in contact with a surface zone of the said article, passing high frequency current thru the shell, the direction of the current being substantially parallel with the surface zone of the said article to induce heating current in the last named surface zone to heat the contacting surface zones of the article and shell to fusing temperatures and to heat an outer part of the shell to a predetermined temperature, applying pressure to said shell to bring the surface zones into welding engagement, and then applying a second shell of predetermined form to an adjacent surface zone of the aforesaid article and with an edge of the second shell in substantially abutting relation with an edge of the first shell by the steps employed in attaching the first shell to form with the first shell a substantially continuous surface zone on said article.

8. In a method of manufacturing a composite article the steps comprising forming a metallic shell so that a surface zone of the shell corresponds approximately with the shape of a surface zone of the article, applying a flux to one of the surface zones, bringing the surface zone of the shell into proximity with the surface zone of the article so that the flux lies between the surface zones, connecting a source of periodically varying current to the shell to cause inducing current to flow in the shell in a direction substantially parallel with the surface zone of the article to induce sufficient heating current in the last named surface zone to heat the said zone to fusing temperature, and then applying pressure to the shell to expel said flux and to bring the surface zone of the shell into welding engagement with the surface zone of the article.

9. The method of attaching a circumferentially extending shell to an article, the steps comprising applying a coating of fusible metal to a surface of the shell, bringing the coated surface of the shell into proximity with a surface zone of the article, bringing terminals of a source of periodically varying current into current conducting contact with parts of the shell, said parts being spaced along an arc of the shell, passing periodically varying current from one of said terminals to another of the terminals through said shell, the shell serving as an inductor to induce heating current in the proximate surface zone of the article to heat the said surface zone to fusing temperature, continuing the flow of current in the shell until heat due to the inducing current in the shell combined with heat transferred from the heating surface zone of the article heats the aforesaid coating to fusing temperature, and then pressing the coating of the shell into substantially uniform contact with the surface zone of the article.

FRANCIS S. DENNEEN.
WILLIAM C. DUNN.